US 6,571,481 B1

(12) United States Patent
Weiss

(10) Patent No.: US 6,571,481 B1
(45) Date of Patent: Jun. 3, 2003

(54) AUTOMATIC LOW TIRE PRESSURE DETECTOR

(76) Inventor: Jeffrey N. Weiss, 7600 Ventura La., Parkland, FL (US) 33067

( * ) Notice: Subject to any disclaimer, the term of this patent is extended or adjusted under 35 U.S.C. 154(b) by 0 days.

(21) Appl. No.: 09/514,457

(22) Filed: May 16, 2000

(51) Int. Cl.$^7$ .......................... G01B 5/20; B01D 21/00; B60C 23/00
(52) U.S. Cl. .......................... 33/203; 33/336; 33/600; 340/442; 340/689
(58) Field of Search .......................... 33/333, 335, 336, 33/337, 340, 347, 354, 370, 371, 203, 203.18, 366.11, 366.12, 366.13, 366.15, 366.24; 116/34 R; 340/442, 686.1, 689, 309.15

(56) References Cited

U.S. PATENT DOCUMENTS

| | | | |
|---|---|---|---|
| 1,638,983 A | | 4/1927 | Crone |
| 3,181,118 A | | 4/1965 | Perry |
| 4,044,473 A | * | 8/1977 | Crask .......................... 33/333 |
| 4,180,794 A | | 12/1979 | Claxton |
| 4,196,414 A | | 4/1980 | Muller |
| 4,356,638 A | * | 11/1982 | McKenna et al. .......... 33/333 |
| 4,554,527 A | | 11/1985 | Muller |
| 4,554,528 A | * | 11/1985 | Burkel et al. .............. 340/442 |
| 4,814,744 A | | 3/1989 | Collins |
| 4,851,809 A | * | 7/1989 | McAlister .................. 116/34 R |
| 4,943,798 A | | 7/1990 | Wayne |
| 4,977,524 A | * | 12/1990 | Strege et al. ............... 33/203 |
| 5,365,967 A | * | 11/1994 | Moore ....................... 116/34 R |
| 5,398,019 A | * | 3/1995 | Barnett et al. ............. 340/573.7 |
| 5,402,105 A | * | 3/1995 | Doyle et al. ............... 340/689 |
| 5,477,211 A | * | 12/1995 | Reynolds ................... 340/689 |
| 5,529,153 A | * | 6/1996 | Smith ....................... 188/266.2 |
| 5,578,984 A | | 11/1996 | Nakajima |
| 5,721,528 A | | 2/1998 | Boesch et al. |
| 5,770,797 A | * | 6/1998 | Lapohn ..................... 116/34 R |
| 5,790,016 A | * | 8/1998 | Konchin et al. ............ 340/448 |
| 6,154,970 A | * | 12/2000 | Reicheld et al. ........... 33/203 |
| 6,243,007 B1 | * | 6/2001 | McLaughlin et al. ...... 340/447 |
| 6,275,148 B1 | * | 8/2001 | Takamura et al. ......... 340/442 |
| 6,278,363 B1 | * | 8/2001 | Bezek et al. .............. 340/442 |
| 6,294,989 B1 | * | 9/2001 | Schofield et al. .......... 340/438 |
| 6,356,203 B1 | * | 3/2002 | Halleck et al. ............ 340/686.1 |
| 6,448,891 B2 | * | 9/2002 | Barnett ..................... 340/438 |
| 6,453,737 B2 | * | 9/2002 | Young et al. .............. 340/447 |
| 6,518,875 B2 | * | 2/2003 | DeZorzi .................... 340/442 |

* cited by examiner

Primary Examiner—Diego Gutierrez
Assistant Examiner—Yaritza Guadalupe
(74) Attorney, Agent, or Firm—Malin, Haley & DiMaggio, P.A.

(57) ABSTRACT

A device for automatically detecting a change in inclination beyond a threshold level is provided. Preferably the change in inclination results from a reduction of pressure for a tire associated with a vehicle. In the preferred embodiment mercury tilt switches are preferably placed at right angles to each other and are placed at least substantially parallel to the horizontal plane. The contacts of the tilt switch can be at least substantially vertically oriented to further reduce spurious activation. The tilt switches are preferably connected to a timing circuit such that only a preset time duration activation will result in a signal being sent to a notification device, such as a light, sound, or other indication member or device.

27 Claims, 2 Drawing Sheets

AUTOMATIC LOW TIRE PRESSURE DETECTOR

CROSS-REFERENCE TO RELATED APPLICATIONS

This invention was disclosed in the Disclosure Documents Program of the U.S. Patent and Trademark Office on Apr. 27, 1999, Disclosure Document No. 455437.

STATEMENT REGARDING FEDERALLY SPONSORED RESEARCH OR DEVELOPMENT

N/A

BACKGROUND OF THE INVENTION

1. Field of the Invention

This invention relates to the automatic detection and identification of a tire with low pressure and a notification device to alert the user of the situation.

2. Description of Related Art

Low tire pressure increases the tread wear and shortens the effective life of a tire. If the tire pressure is sufficiently low, a decrease in steering control will occur which may lead to an accident. A significant loss of tire pressure may cause the tire to rupture, commonly known as a tire "blowout", which leads to a sudden loss of tire pressure with an immediate effect on steering control thus increasing the risk of an accident.

At the present time, it is incumbent upon the user of a vehicle employing tires to remember to manually self-check the tire pressure using one of the commonly available tire pressure gauges. Unfortunately, tire pressure is frequently not checked because the person forgets, does not have access to a working tire gauge, is physically unable to check the tire pressure, or for other reasons. Even if the tire pressure is routinely checked on a predetermined schedule, an acute event, such as a tire puncture from hitting road debris, driving conditions, temperature, vehicle load or other factors may affect the tire pressure and go unnoticed by the user of the vehicle until an attendant problem, as described above, occurs.

This invention relates generally to an improvement in the means for detecting a change in slope of a member relative to a reference and the notification of the user. The simplicity of use and the commercial practicality of manufacture of the device is a material advantage over existing systems.

Slope detectors or inclinometers have been previously used as flat tire detectors and have been combined with notification devices to inform the vehicle operator of a loss in tire pressure. One such device incorporates a mercury tilt switch. A pool of mercury is enclosed in a housing and a change in the slope of the housing causes the mercury to shift thus closing a pair of electrical contacts. The closure of the contacts activates a notification device to indicate a loss of tire pressure.

The prior art devices systems were not without drawbacks including spurious indication of a flat tire such as occurs when a tire hits a pothole or were impractical to use, inexpedient or not commercially feasible to.manufacture. It is, therefore, to the effective resolution of the aforementioned problems and shortcomings that the present invention is directed.

Accordingly, it is an object of this invention to provide a device to automatically identify a tire with low pressure.

It is another object of this invention to provide an automatic system where the user of a device with tires is notified when the tire pressure is below the preset recommended minimum.

It is still another object of this invention to provide a stable support such that the devices may be easily and firmly affixed to the vehicle.

BRIEF SUMMARY OF THE INVENTION

The foregoing objects are achieved and the foregoing problems are solved in one illustrative embodiment of the invention in which inclinometers, such as, but not limited to, mercury tilt switches are preferably placed at right angles to each other and are placed at least substantially parallel to the horizontal plane. The contacts of the tilt switch can be at least substantially vertically oriented to further reduce spurious activation. The tilt switches are preferably connected to a timing circuit such that only a preset time duration activation will result in a signal being sent to a notification device, such as a light, sound, or other indication member or device.

In one embodiment of the device, four tilt switches are employed, two are preferably oriented at least substantially perpendicular to the other two and all are in the same plane. The contacts of each switch are at the opposite end of each of the other switches. As an example, the activation of the contacts on the right and upper most contacts will indicate a deflation of the right front tire. Similarly, the activation of the contacts on the left and lower most contacts will indicate a deflation of the left rear tire. The tilt switches are preferably wired to, or otherwise in communication with time delay/circuit, such as a two minute time delay which would indicate that the contacts were closed for preferably a two minute interval before a light, sound etc. would activate.

The two minute interval is chosen by way of example and is not considered limiting and other time intervals can be chosen and are also considered within the scope of the invention. The preferred time delay should help prevent an acute change, like a vehicle hitting a curve or pothole, from spuriously notifying the user that a flat tire has occurred. In the preferred embodiment, the detection and notification device are enclosed in a hard case which is affixed to the front windshield or front dashboard by suction cup, Velcro, adhesive or other means. The deflation of a tire would activate a light, sound or other notification device indicating which tire had deflated. Alternatively, the device may be affixed to the roof of the vehicle and the notification device would be a sound drawing the attention of the driver to the possibility that a tire had deflated. In another variation of the device, the detection device may be affixed to the roof of the vehicle or another location and the notification device placed within visualization of the driver, such as in or on the front dashboard or windshield. The devices may be connected and/or communicate by wires, infrared, remote control or another method. The power of the device may be internal battery, the vehicle's cigarette light or other auxiliary power port or the vehicle's electrical system depending upon the location of the device.

In another embodiment of the invention, two devices, each consisting of three tilt switches are connected to a timing circuit and notification device. Each device consists of two at least substantially parallel switches with the contacts at opposing ends and one tilt switch oriented at least substantially perpendicular to the other two. One device would be placed in the front of the vehicle, as described above, the other on the rear window or ledge. The front device will contain a tilt switch with the perpendicular switch oriented with a front facing contact, the rear device will contain the perpendicular switch oriented with a rear facing contact. The front device will assess the deflation of the front two tires, the rear device will assess the deflation of the rear two tires. A timing circuit is again preferably employed to reduce spurious notification as would take place if a tire hit a pothole. The two devices could be wired together, or alternatively, individually provide a signal to the notification device. The notification would be activated by wire, infrared or a radio controlled signal activating a light or sound or other means. The power for the devices may be battery or wired into the vehicle's electrical system.

In another embodiment of the device, four separate sensors, each containing two tilt switches oriented at least substantially perpendicular to one another with the contacts closest to each switch are used. They may be placed on the vehicle's axle, inside the body near the wheel, in the front and rear light assemblies, in the engine compartment and the trunk, in the passenger compartment, or in another location, the goal being that two front sensors reflect the inflation of the two front tires and the two back sensors reflect the inflation of the two rear tires. The timing circuit may be directly attached to the sensors or connected by wire, or other communication means, to the sensors and be incorporated within the notification device. Alternatively, the sensors may be connected by remote radio control. The power supply may be battery or wired into the vehicle's electrical system.

In accordance with these and other objects which will become apparent hereinafter, the instant invention will now be described with particular reference to the accompanying drawings.

BRIEF DESCRIPTION OF THE SEVERAL VIEWS OF THE DRAWINGS

The invention may be better understood by reference to the drawings in which.

DETAILED DESCRIPTION OF THE INVENTION

Figure 1:
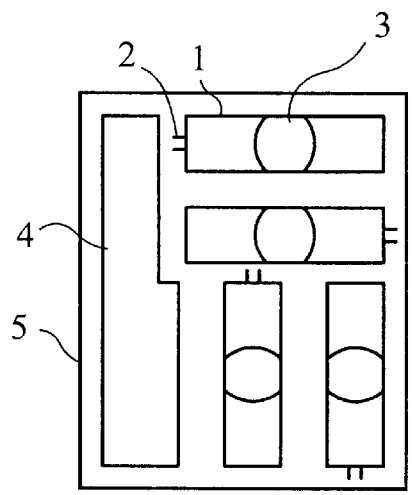
FIG. 1 is an internal view of a first embodiment of the present invention.

FIG. 1 illustrates a first embodiment of the tire inflation device showing the mercury tilt switches or inclinometers (1) with the contacts (2) preferably oriented at least substantially perpendicular to the horizontal plane. The shift in slope, such as ten degrees, in the required direction causes the mercury to close the contacts (3). One such mercury tilt switch is manufactured by GC Thorsen, Inc. of Rockford,. Ill. The tilt angle of the inclinometer can be preferably 10 degrees, though such is not considered limiting and other angles may be used and are considered within the scope of the invention. A first pair of inclinometers are disposed at least substantially parallel to each other and a second pair of inclinometers, also disposed at least substantially parallel to each other, are disposed at least substantially perpendicular to the first pair of inclinometers in the frontal plane. It is apparent that the inclinometers can be mounted at an angle to the horizontal plane such the tilt angle used to close the switch may be increased or decreased. The two contacts within each inclinometer are preferably oriented at least substantially perpendicular to the horizontal plane. The device can also contain a factory preset timing device and power supply (4) and is preferably enclosed in a hard robust case (5).

Figure 2:
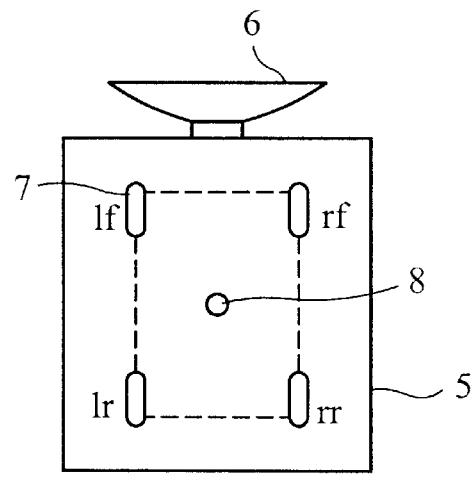
FIG. 2 is a frontal view of a first embodiment of the present invention.

FIG. 2 illustrates the display for the first embodiment. The device may be affixed to the front windshield, or other location on the vehicle, using a suction cup (6) or alternatively with velcro or an adhesive. The display consists of preferably four lights which when activated or energized will illuminate and identify the position of the deflated tire (7). Alternatively, a single light with preferably four different lighting flash patterns or sequences can be used. Also a sound or another notification device may be used. The sound/audible device can also be provided with multiple patterns, such as, but not limited to, different beeping or noise patterns. An on/off switch (8) can also be provided.

Figure 3A:
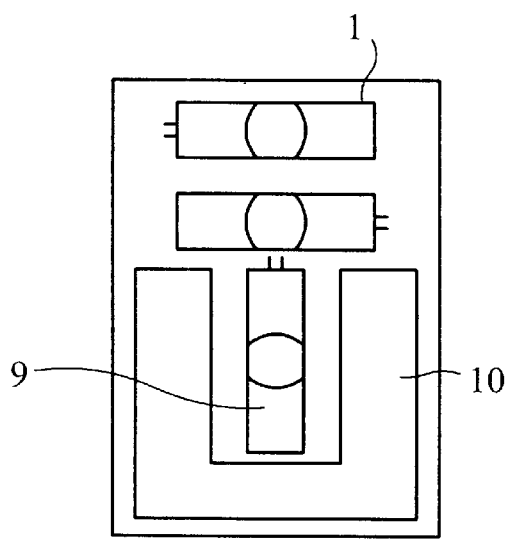
FIG. 3a is an internal view of the front mounted sensors of the second embodiment of the present invention which would reflect the inflation status of the two front tires of a four wheeled automobile.

As seen in FIG. 3a another embodiment of the present invention is shown, wherein two of the inclinometers (1) are arranged at least substantially parallel to one another and the remaining inclinometer is disposed at least substantially perpendicular to the other two (9). This configuration would be used to detect the inflation status of the two front tires. It is apparent that the configuration of the inclinometers is determined by the number of tires and tire configuration of the vehicle to be monitored and is not limited by the presently illustrated configurations. The power supply may be an internal battery (10) or alternatively may be connected into or directly wired into the vehicle's power supply. The timer delay may be provided and incorporated within the sensor module (10) or be attached to the notification device. The output of this device is preferably connected to a display, such as the display of FIG. 2, by wires, infrared or radio transmitter. One such radio transmitter and receiver is manufactured by Radio Shack. The deflation of one or more tires would activate a light or lights under the text corresponding to the deflated tire or tires (7). The sensor may be placed under the automobile, in the engine and trunk compartments, in the cabin or another suitable location. The power for the display would be provided by a battery or the vehicle itself. One alternative to the power supply would be to plug the notification device into an automobile's cigarette lighter.

Figure 3B:
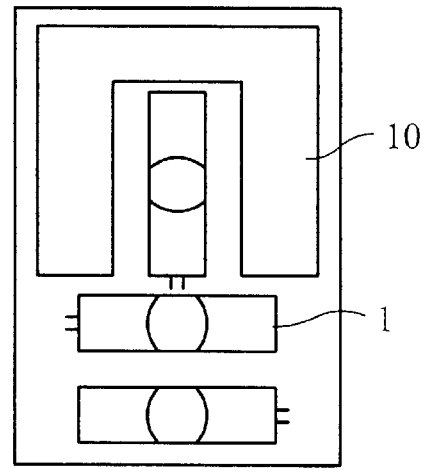
FIG. 3b is an internal view of the rear mounted sensors of the second embodiment of the present invention which would reflect the inflation status of the two rear tires of a four wheeled automobile.

FIG. 3b demonstrates the inclinometer arrangement used to monitor the inflation status of the rear two tires.

Figure 4A:
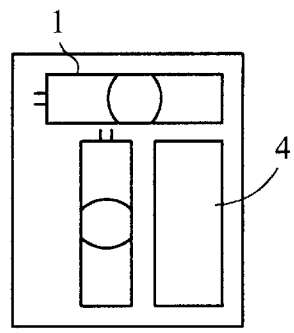
FIG. 4a is an internal view of the third embodiment of the device sensing the inflation status of the left front tire.

FIG. 4a illustrates another embodiment of the invention and shows the orientation of two inclinometers (1) placed at least substantially perpendicular to one another. In this orientation the sensors would detect the inflation status of the left front tire of a four wheeled automobile. The sensor may be attached to the axle, inside the engine compartment or another suitable place such that the inflation status of the left front tire could be successfully monitored. The power supply for the device (4) would be provided by an internal battery or the vehicle's own power supply. It is expected that the location of the sensor in relation to the easy availability of power or accessibility will determine the appropriate power supply. The sensors are connected to the notification device by wires, radio or other alternative means. The time delay may be provided and incorporated within the sensor module (4) or attached to the notification device.

Figure 4B:
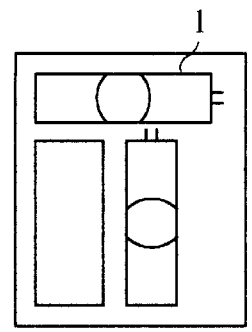
FIG. 4b is an internal view of the third embodiment of the device sensing the inflation status of the right front tire.

FIG. 4b illustrates the orientation of the sensors used to detect the inflation status of the right front tire.

Figure 4C:
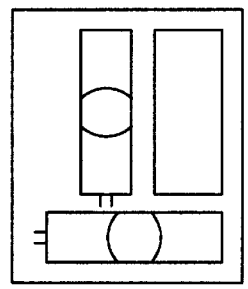
FIG. 4c is an internal view of the third embodiment of the device sensing the inflation status of the left rear tire.

FIG. 4c demonstrates the inclinometer orientation used to monitor the inflation status of the left rear tire.

Figure 4D:
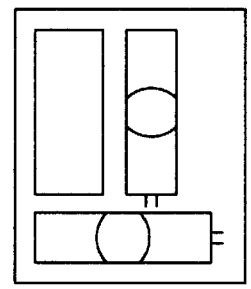
FIG. 4d is an internal view of the third embodiment of the device sensing the inflation status of the right rear tire.

FIG. 4d illustrates the orientation of the detector or inclinometer used to monitor the inflation status of the right rear tire.

Figure 5:
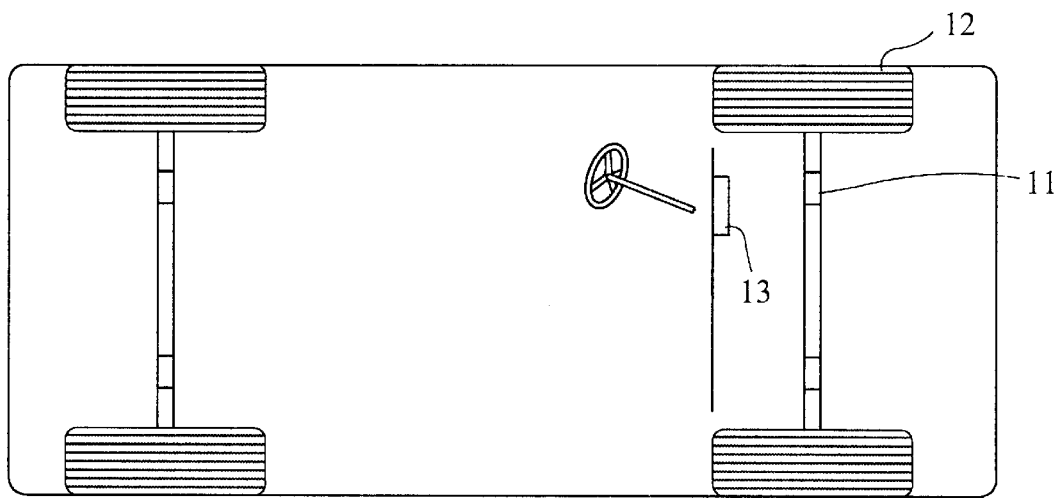
FIG. 5 is a perspective view of the third embodiment of the four sensors mounted on an automobile.

FIG. 5 illustrates the placement of the four sensor modules (11) around a four-wheeled (12) vehicle and the notification panel (13).

Changes in modification within the spirit and scope of the invention will be apparent to those skilled in the art. Such modifications and changes are intended to be covered by the claims herein. The illustrated embodiments refer to mercury tilt switches with contacts at one end. It is apparent that another type of inclinometer may be used or alternatively mercury tilt switches with contacts at both ends could be employed which would decrease the number of required inclinometers needed to perform the desired function. The illustrated embodiments also refer to the monitoring of the tires of a four-wheeled automobile. However, this embodiment is also not limiting and modifications to the invention such that the monitoring of vehicles with either less or more than four wheels will be apparent.

It should also be apparent that the invention can be used with vehicles that include more than one tire at the end of one or more of their axles, such as an "eighteen wheeler" semi. In these situations, a detector in accordance with the present invention can be associated with each specific tire or with the specific area (thus covering the plurality of tires located at the end of such axle).

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A device for automatically detecting a change in inclination beyond a threshold level, comprising:
    means for detecting a change in inclination of a portion of a vehicle beyond a threshold level from a reduction of pressure in a tire of the vehicle, said means for detecting attached to the vehicle; and
    means for notifying when the change in inclination has remained for a predetermined time period;
    wherein said means for detecting comprises:
        a first single component inclinometer in communication with said means for notifying;
        a second single component inclinometer in communication with said means for notifying, said second single component inclinometer disposed substantially perpendicular to said first single component inclinometer; and
        means for activating said means for notifying when a change in inclination remains for a predetermined time period;
        wherein when a change in inclination remains for a predetermined time period said first single component inclinometer and said second single component inclinometer permit said means for notifying to be activated by said means for activating.

2. The device or automatically detecting a change in inclination of claim 1 wherein said first single component inclinometer and said second single component inclinometer are mercury tilt switches.

3. The device for automatically detecting a change in inclination of claim 1 wherein said means for notifying comprises:
    an indication member; and
    a timing circuit in communication with said first single component inclinometer and said second single component inclinometer, said timing circuit activating said indication member only when a change in inclination has lasted for at least a preset time interval defined by said timing circuit.

4. The device for automatically detecting a change in inclination of claim 3 wherein said indication member is a visual display.

5. The device for automatically detecting a change in inclination of claim 3 wherein said indication member is an audible sound producing member.

6. The device for automatically detecting a change in inclination of claim 3 wherein said first single component inclinometer and said second single component inclinometer are mercury tilt switches.

7. The device for automatically detecting a change in inclination of claim 1 wherein said vehicle is a motorized vehicle.

8. A device for automatically detecting a change in inclination for a vehicle beyond a threshold level, said vehicle having a plurality of tires, said device comprising:
    a first indication member associated with a first at least one of said plurality of tires;
    a second indication member associated with a second at least one of said plurality of tires, said second at least one of said plurality of tires different then said first at least one of said plurality of tires;
    a first single component inclinometer having a contacts end and attached to a vehicle;
    a second single component inclinometer having a contacts end and attached to the vehicle, said second single component inclinometer disposed substantially parallel with said first single component inclinometer and such that their contact ends are disposed opposite with respect to each other;
    a third single component inclinometer having a contacts end and attached to the vehicle, said third single component inclinometer disposed substantially perpendicular with said first single component inclinometer and said second single component inclinometer and such that its contacts end is disposed closest to said first single component inclinometer and said second inclinometer, said first inclinometer and said third single component inclinometer in communication with said first indication member, said second single component inclinometer and said third single component inclinometer in communication with said second indication member;
    means for automatically activating an associated indication member from the group of said first indication member and said second indication member when the contacts end of said third single component inclinometer and the contacts end of either said first single component inclinometer or said second single component inclinometer have been closed for at least a preset time interval from a reduction of pressure in a tire.

9. The device for automatically detecting a change in inclination of claim 8 wherein said means for activating comprises:
   a timing circuit for defining the preset time interval; and
   a power source for energizing either said first indication member or said second indication member when a change in inclination for the vehicle exceeds a threshold level and remains for at least the preset time interval.

10. The device for automatically detecting a change in inclination of claim 9 wherein said power source is a battery.

11. The device for automatically detecting a change in inclination of claim 8 wherein said first single component inclinometer, said second single component inclinometer and said third single component inclinometer are mercury tilt switches.

12. The device for automatically detecting a change inclination of claim 8 wherein said first indication member is a first light emitting diode and said second indication member is a second light emitting diode.

13. The device for automatically detecting a change in inclination of claim 12 wherein said first light emitting diode and said second light emitting diode are incorporated into a display.

14. The device for automatically detecting a change in inclination of claim 8 further including a substantially rigid housing; wherein said first single component inclinometer, said second single component inclinometer and said third single component inclinometer are disposed within said housing.

15. The device for automatically detecting a change in inclination of claim 14 wherein said housing having a body member attached to a non wheel or tire portion of said vehicle.

16. The device for automatically detecting a change in inclination of claim 8 wherein said vehicle is a motorized vehicle.

17. A device for automatically detecting a change in inclination for a vehicle beyond a threshold level, said vehicle having a plurality of tires, said device comprising:
   a first indication member associated with a first at least one tire of said plurality of tires;
   a second indication member associated with a second at least one tire of said plurality of tires, said second at least one of said plurality of tires different then said first at least one of said plurality of tires;
   a third indication member associated with a third at least one tire of said plurality of tires, said third at least one of said plurality of tires different then said first at least one of said plurality of tires and said second at least one of said plurality of tires;
   a fourth indication member associated with a fourth at least one tire of said plurality of tires, said fourth at least one of said plurality of tires different then said first at least one of said plurality of tires and said second at least one of said plurality of tires and said third at least one of said plurality of tires;
   a first single component inclinometer having a contacts end and attached to a vehicle;
   a second single component inclinometer having a contacts end and attached to the vehicle, said second single component inclinometer disposed substantially parallel with said first single component inclinometer and such that their contact ends are disposed opposite with respect to each other;
   a third single component inclinometer having a contacts end and attached to the vehicle, said third single component inclinometer disposed substantially perpendicular to said first single component inclinometer and said second single component inclinometer and such that its contacts end is disposed closest to said first single component inclinometer and said second single component inclinometer, said first single component inclinometer and said third single component inclinometer in communication with said first indication member, said second single component inclinometer and said third single component inclinometer in communication with said second indication member;
   a fourth single component inclinometer having a contacts end and attached to the vehicle, said fourth single component inclinometer disposed substantially perpendicular to said first single component inclinometer and said second single component inclinometer and such that its contacts end is disposed furthest to said first single component inclinometer and said second single component inclinometer, said fourth single component inclinometer disposed substantially parallel with said third single component inclinometer, said first single component inclinometer and said fourth single component inclinometer in communication with said third indication member, said second single component inclinometer and said fourth single component inclinometer in communication with said fourth indication member;
   means for automatically activating an associated indication member from the group of said first indication member, said second indication member, said third indication member and said fourth indication member when the contacts end of either said first single component inclinometer or said second single component inclinometer and the contacts end of either said third single component inclinometer or said fourth single component inclinometer have been closed for at least a preset time interval from a reduction of pressure in a tire of a vehicle.

18. The device for automatically detecting a change in inclination of claim 17 wherein said means for activating comprises:
   a timing circuit for defining the preset time interval; and
   a power source for energizing either said first indication member, said second indication member, said third indication member or said fourth indication member when a change in inclination for the vehicle exceeds a threshold level and remains for at least the preset time interval.

19. The device for automatically detecting a change in inclination of claim 18 wherein said power source is a battery.

20. The device for automatically detecting a change in inclination of claim 17 wherein said first single component inclinometer, said second single component inclinometer, said third single component inclinometer and said fourth single component inclinometer are mercury tilt switches.

21. The device for automatically detecting a change in inclination of claim 17 wherein said first indication member is a first light emitting diode, said second indication member is a second light emitting diode, said third indication member is a third light emitting diode and said fourth indication member is a fourth light emitting diode.

22. The device for automatically detecting a change in inclination of claim 21 wherein said first light emitting diode, said second light emitting diode, said third light emitting diode and said fourth light emitting diode are incorporated into a display.

23. The device for automatically detecting a change in inclination of claim 17 further including a substantially rigid housing; wherein said first single component inclinometer, said second single component inclinometer, said third single component inclinometer and said fourth single component inclinometer are disposed within said housing.

24. The device for automatically detecting a change in inclination of claim 23 wherein said housing having a body member attached to a non wheel or tire portion of said vehicle.

25. The device for automatically detecting a change in inclination of claim 17 wherein said vehicle is a motorized vehicle.

26. A device for automatically detecting a reduction in tire pressure for a tire of a vehicle beyond a threshold level, comprising:
  single component inclinometer means for detecting a reduction of pressure in a tire of a vehicle beyond a threshold level, said single component inclinometer means for detecting attached to a vehicle; and
  means for automatically notifying when the change in reduction of pressure in a tire detected by said inclinometer means has remained for a predetermined time period.

27. The device for automatically detecting a change in inclination of claim 26 wherein said vehicle is a motorized vehicle.

* * * * *